N. POGOLSKI.
METHOD OF INDICATING AND RECORDING THE AIMING OF GUNS.
APPLICATION FILED FEB. 28, 1908.
906,924.
Patented Dec. 15, 1908.
2 SHEETS—SHEET 1.
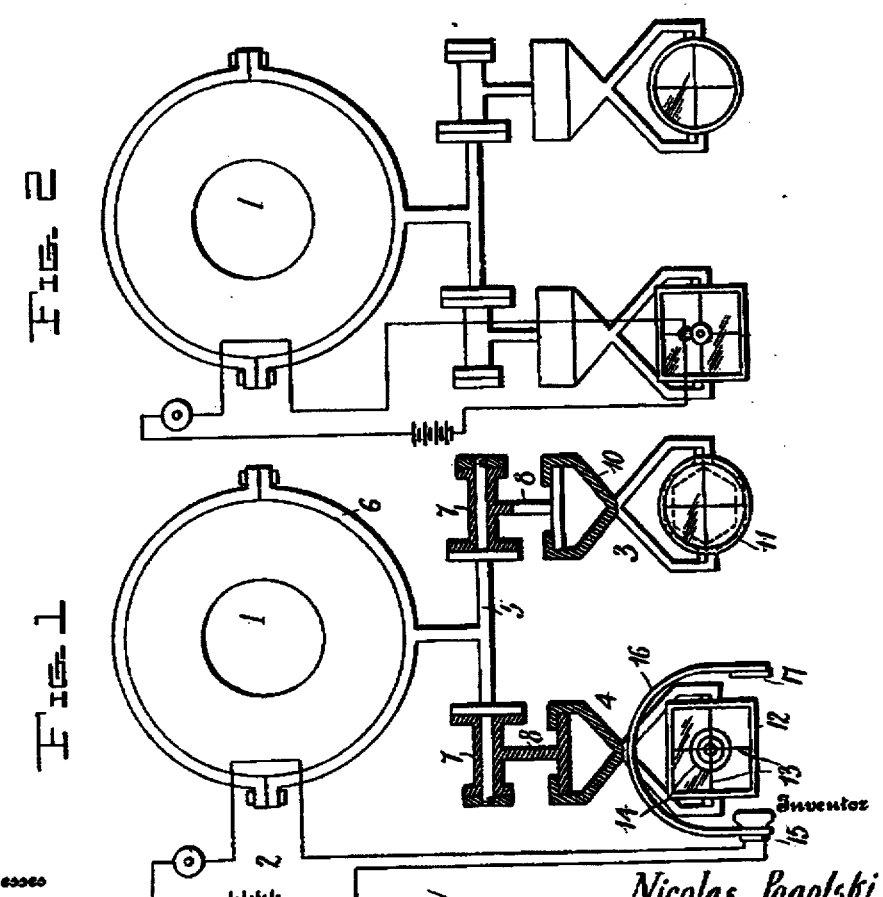

N. POGOLSKI.
METHOD OF INDICATING AND RECORDING THE AIMING OF GUNS.
APPLICATION FILED FEB. 28, 1908.
906,924.
Patented Dec. 15, 1908.
3 SHEETS—SHEET 2.
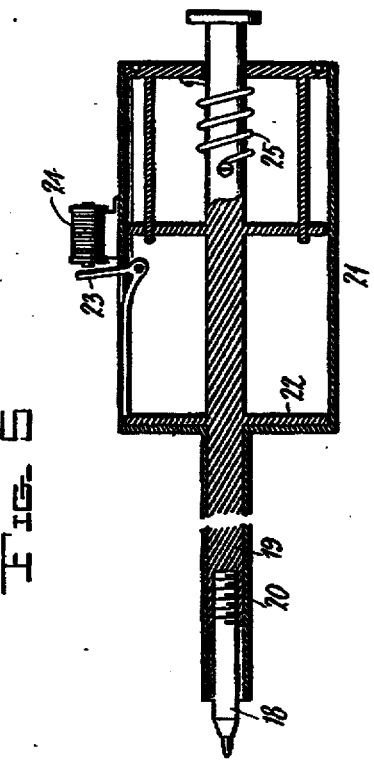
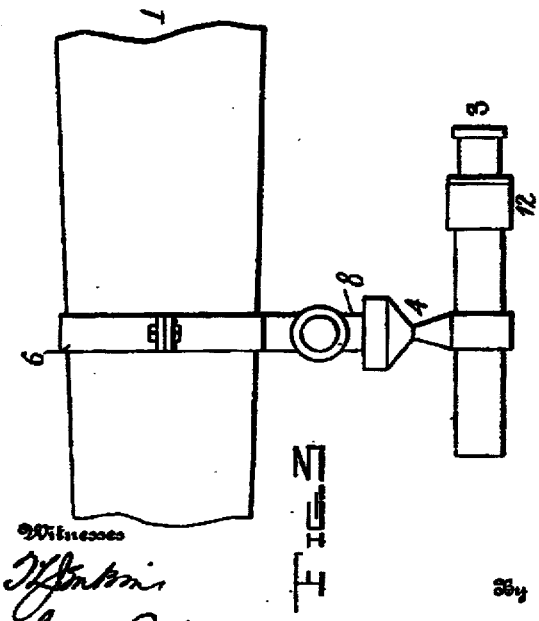
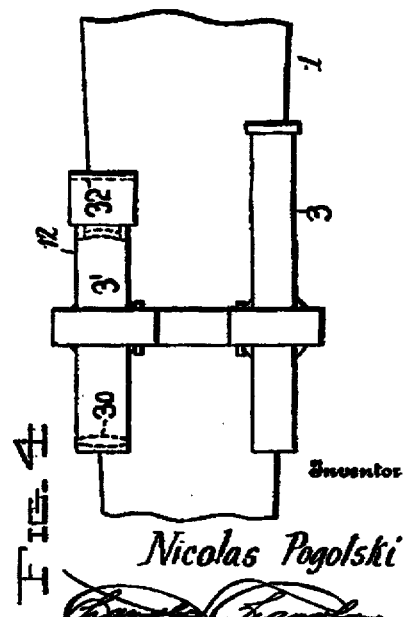
Witnesses
Inventor
Nicolas Pogolski
Attorneys

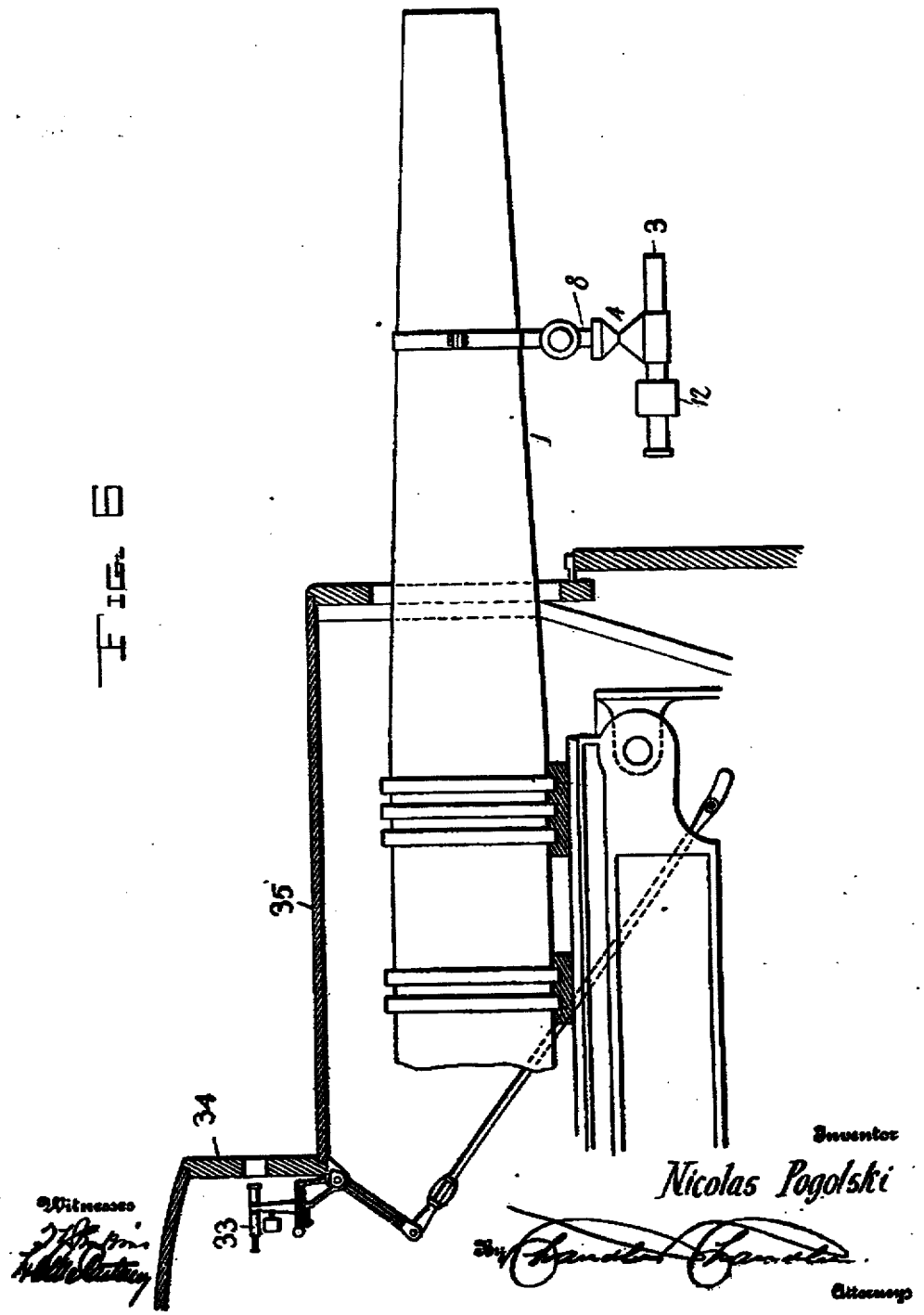

UNITED STATES PATENT OFFICE.

NICOLAS POGOLSKI, OF WILKES-BARRE, PENNSYLVANIA.

METHOD OF INDICATING AND RECORDING THE AIMING OF GUNS.

No. 906,924.  Specification of Letters Patent.  Patented Dec. 15, 1908.

Application filed February 28, 1908. Serial No. 418,260.

*To all whom it may concern:*

Be it known that I, NICOLAS POGOLSKI, a subject of the Emperor of Russia, residing at Wilkes-Barre, in the county of Luzerne, State of Pennsylvania, have invented certain new and useful Improvements in Methods of Indicating and Recording the Aiming of Guns; and I do hereby declare the following to be a full, clear, and exact description of the invention, such as will enable others skilled in the art to which it appertains to make and use the same.

The present invention has reference to a method of indicating and recording the aiming of guns, the prime object of the invention residing in the substitution for the enormously expensive methods heretofore employed in target practice of another which is not only simpler, more convenient and more effective, but also may be put into practice at a hardly appreciable cost.

The improved methods briefly described, consist in registering the position of the target relatively to the position of the line of vision of the sighting telescope at the exact moment of the discharge of the gun.

In carrying out this method a pointer's telescope and a photographic apparatus, which latter includes a telescope provided with a tele-photo lens, are suspended from the gun in such a manner that their optical axes remain constantly parallel with each other. If, then, the point of a pencil be applied to the image of the target projected upon the ground glass of the first mentioned telescope and then constantly kept on the image, following its movement, a line will be traced upon the glass corresponding to the course followed by the target ship, the termination of such line caused by the automatic or manual removal of the pencil point from the glass at a given signal *i. e.*, the exact moment of the firing of the gun, indicating the position of the image of the target relative to two crossed lines traced on the ground glass through the optical axis of the telescope. It is evident, therefore, that the actual discharge of the gun is unnecessary to determine the accuracy of the aim, inasmuch as the actuation of the firing attachment (ordinarily accomplished by the application of pressure upon a key, with a resultant closing of an electrical circuit) effects the withdrawal of the pencil point from the ground glass.

The invention will be understood from a consideration of the following detailed description in connection with the accompanying drawings, in which corresponding parts or features, as the case may be, are designated by the same reference numerals in the several views.

Of the said drawings: Figure 1 is a diagrammatic view of the invention in its simplest form. Fig. 2 is a similar view of a modified form of the invention. Figs. 3 and 4 are respectively, fragmental side and bottom plan views of Fig. 1. Fig. 5 is an enlarged detail view in section of the pencil-carrying sleeve and the actuating devices connected with the same. Fig. 6 is a side view of the complete invention.

Referring more particularly to the drawings, and especially to Figs. 1 and 6, in which the simplest form of the invention is illustrated, 1 indicates generally the gun; 2 the electrical firing attachment therefor; 3 the pointer's telescope; 4 the photographic apparatus; and 33 the sighting apparatus disposed within the hood portion 34 of the turret 35. Both the pointer's telescope and the photographic apparatus are suspended from a horizontal bar 5, which is in turn suspended from the gun by a strap 6 comprising upper and lower members whose adjacent ends are connected together in any preferred manner, each end of the bar 5 having secured thereto a sleeve 7 from which depends an arm 8 whose headed lower end is connected with the flanged upper end of a supporting bracket 10. To the lower end of one bracket is secured the pointer's telescope 3, and to that of the other bracket the photographic apparatus 12.

It will be apparent that the above arrangement affords means for the installation of the complete apparatus in the required position. The photographic apparatus shown in Fig. 4, includes a single achromatic telescopic lens, 30, a negative lens 31, and a ground glass 32, there being drawn upon the last mentioned element in an indelible way two crossing lines 13 and in addition thereto, a series of concentric circles 14. Instead of the above photographic apparatus any of the existing in the market can be used, provided it gives images of battleships eight thousand (8,000) yards distant of sufficient size and luminosity to be easily discernible.

The electrical firing attachment 2 above referred to has circuited therewith a bell 15 secured to a head band 16 provided at its ends with ear drums 17, adjacent to one of which the bell above mentioned, is disposed. The head band is adapted to be worn by the gunner, who with the point of his pencil, traces upon the ground glass the course of the target. If, then, the pencil point be removed from the ground glass at the exact moment that the bell is sounded, it will be apparent that the terminal of the line drawn by the pencil will indicate the precise position of the target with reference to the optical axis of the apparatus, and, in consequence, the accuracy of the sighting of the gun.

While the audible signal caused by the sounding of the bell, as above described, is most effective as a means of announcing the actuation of the firing attachment, it will be apparent that the bell may be replaced by a sparking-coil, the discharge spark serving as a visible signal of such actuation. The spark-gap can be arranged on the pencil between the tracing point and the place of the application of the hand.

The men who operate the photographic apparatus and the pointer's telescope occupy seats suspended from the gun and disposed in such a manner as to be screened from the light.

In the modification shown in Fig. 2, the retraction of the pencil point from the ground glass is effected automatically upon the actuation of the firing attachment. In this form of the invention, the pencil 18 has its rear end fitted in a threaded socket formed in the forward end of an endwise movable rod 19. The forward portion of this rod is incased by a sleeve 20 formed integral with the front wall of a cylindrical shell or housing 21, while its rear end, which is headed, extends through an opening formed in the rear wall of the housing in alinement with the bore of said sleeve. Intermediate its ends, the pencil-carrying rod is provided with an integral annular flange 22 which is located interiorly of the housing and is held normally in contact with the front wall of the latter by means of its engagement with the interiorly-located trigger arm of the V-shaped armature 23 of an electric magnet 24 circuited with the firing attachment. When, therefore, the magnet becomes energized upon the actuation of the firing attachment, the trigger arm, which is movable through a longitudinal slot formed in the upper wall of the housing will be released from engagement with the flange 22, whereupon the rod 19 will be retracted under the tension of a retractile coil spring 25 which embraces the rear portion of said rod and is secured at opposite ends thereto and to the rear wall of the housing. This inward movement or retraction of the rod 19 will withdraw the pencil point from the ground glass, as will be obvious.

In connection with this form of the invention, it may be stated that the housing, the detailed construction of which and its attendant parts is illustrated Fig. 5, is held in the hand of the gunner who traces the course of the target upon the ground glass as in the first mentioned instance.

From the foregoing, it will be understood that there is obtained, in both forms of the invention, an absolutely accurate record of what is tantamount to every shot fired, the termination of the lines drawn upon the ground glass indicating the exact position of the target with reference to the optical axis of the photographic or recording apparatus. It will also be apparent that by reason of the fact that there is no actual firing of the gun in any instance, the above described methods of training the gunners may be put into practice at a hardly appreciable cost, while the convenience of such methods admits of the possibility of continuous target practice irrespective of whether the ship is in port or at sea. The practice can likewise be continued at night by electric lighting.

In connection with the form of the invention shown in Fig. 1, it may be stated that after a gunner has become sufficiently familiar with the operation of the apparatus as a whole, and has become possessed of the requisite skill, the use of the pencil employed in indicating upon the ground glass the position of the projected image may be discarded, and the position of said image determined merely by observation, the sounding of the bell or the appearance of the spark indicating the exact instant at which the firing mechanism is actuated.

The superiority of the above method over the actual target practice as means of training can be claimed from two points of view: first, by these methods all variable factors for instance, as the errors in the valuation of distance, the variations in the ballistic properties of gun-powder, the eccentricity of projectiles, etc., are eliminated; consequently, the obtained result gives a true criterion for the skill of gun-pointers; and second, these methods, and they alone, afford the possibility of training in shooting at torpedo-boats when approaching the battle-ship at a speed of thirty (30) miles an hour.

The method of recording the aiming of a gun by means of actual photography has been proposed, as is well known, but such method, although of an absolute precision, possesses, beside the drawbacks of being slow and of entailing considerable expense, an inherent defect of being unavailable at sunset and in some cases at night excepting with the use of electric lighting; while those are precisely the instances where a good aiming and consequently a thorough training becomes a paramount importance, because the missing of the mark in the daylight by the gunner of a twelve-inch gun would be of comparatively small consequence, while at night one sole failure on the part of the quick-firing gunner might mean imminent peril to the battleship thence the advisability of supplementing the photographic method by another not possessing the above drawbacks. On the other hand the efficiency of the method of direct observation is wholly dependent on the proper selection and training of the controller, therefore, some means must be provided for the selection and training of, at least, one man on the battleships; this man might select and train any number of controllers by observing them at work. It is for the purpose of training of the first controller that the photographic apparatus is included in the system. But still the greatest advantage would be derived from the above method if they could be used in actual warfare, viz., when the first shot has been fired and the mark has been missed and when it would have been of the highest importance to know whether the cause of the failure was a faulty pointing, or some errors in the valuation of variable factors.

What is claimed is:

1. The method of indicating the aim of guns which consists in projecting the image of a moving object upon the ground glass of a photographic apparatus having its optical axis constantly parallel with that of the sighting apparatus; in tracing the course followed by the object upon said ground glass; and in terminating such tracing at the instant the firing attachment is actuated.

2. The method of indicating the aim of guns which consists in projecting the image of a moving object upon the ground glass of a photographic apparatus having its optical axis constantly parallel with that of the sighting apparatus; in manually tracing upon the ground glass the course followed by the object; and in terminating such tracing simultaneously with the actuation of the firing attachment.

3. The method of indicating the aim of guns which consists in projecting the image of a moving object upon the ground glass of a photographic apparatus having its optical axis constantly parallel with that of the sighting apparatus; in recording upon the ground glass the course followed by the object; and in terminating such recording simultaneously with the actuation of the firing attachment.

4. The method of indicating the aim of guns which consists in projecting the image of a moving object upon the ground glass of a photographic apparatus having its optical axis constantly parallel with that of the sighting apparatus; in tracing with a pencil upon the ground glass the course followed by the object; and in withdrawing the pencil point from contact with the glass simultaneously with the actuation of the firing attachment.

5. The method of indicating the aim of guns which consists in projecting the image of a moving object upon the ground glass of a photographic apparatus having its optical axis constantly parallel with that of the sighting apparatus; in tracing with a pencil upon the ground glass the course followed by the object; and in automatically withdrawing the pencil point from contact with the ground glass at the instant the firing attachment is actuated.

6. The method of indicating the aim of guns, which consists in projecting the image of a moving object upon the ground glass of a photographic apparatus having its optical axis constantly parallel with the bore of the gun; in manually tracing upon the ground glass the course followed by the object; in signaling the actuation of the firing attachment; and in terminating the tracing at the instant of the signaling.

In testimony whereof, I affix my signature, in presence of two witnesses.

NICOLAS POGOLSKI.

Witnesses:
M. T. MILLER,
GEO. H. CHANDLEE.